Oct. 8, 1968     M. CICOGNANI ET AL     3,404,576
BELT AND GEAR DRIVE
Filed Oct. 28, 1966     2 Sheets-Sheet 1
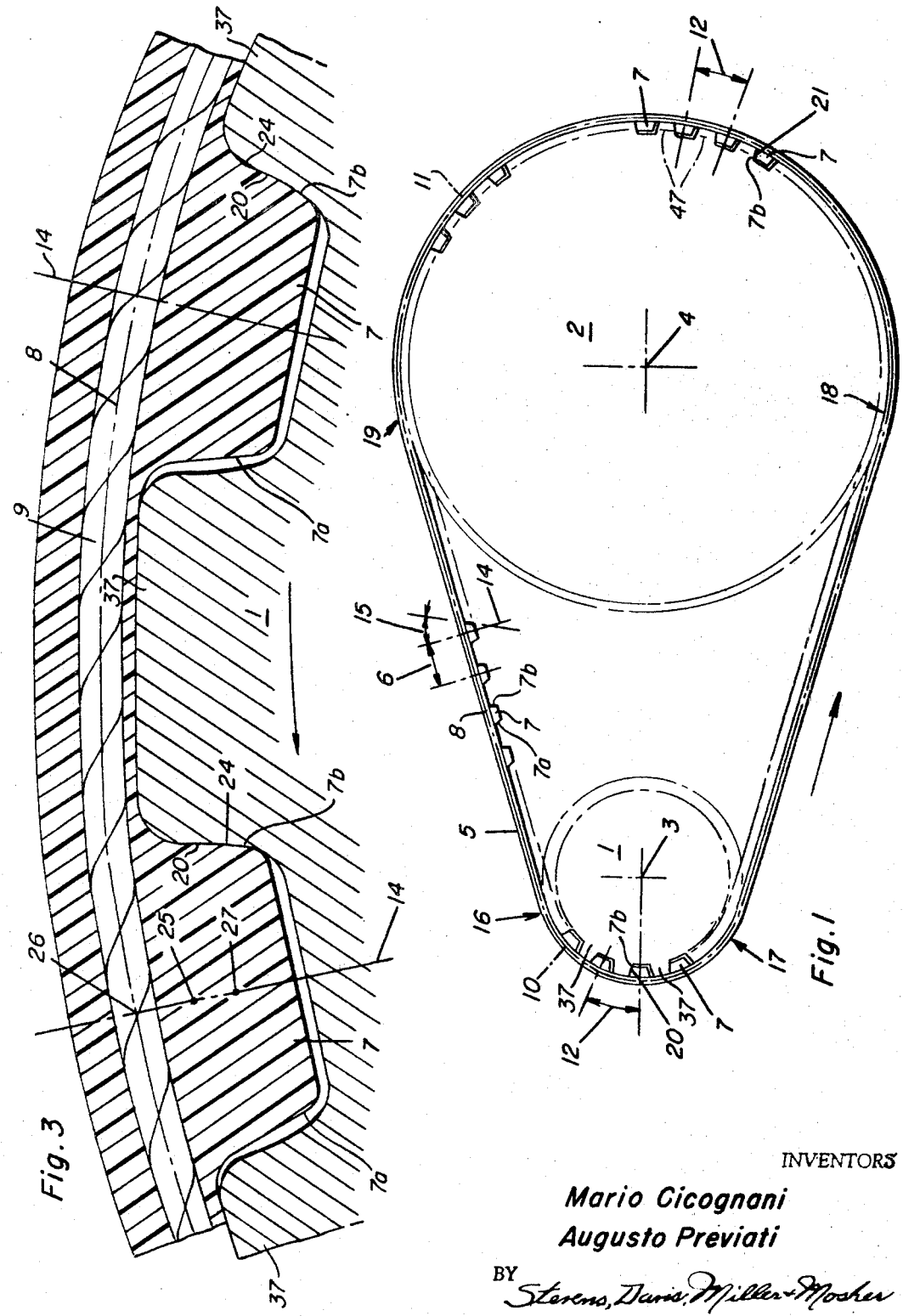
INVENTORS
*Mario Cicognani*
*Augusto Previati*
BY *Stevens, Davis, Miller & Mosher*
ATTORNEYS Oct. 8, 1968     M. CICOGNANI ET AL     3,404,576
BELT AND GEAR DRIVE
Filed Oct. 28, 1966     2 Sheets-Sheet 2
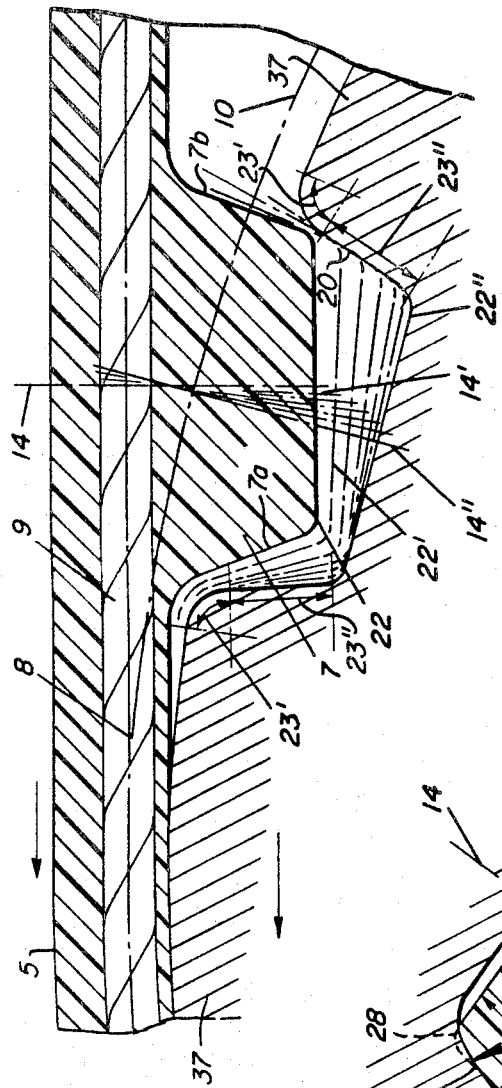
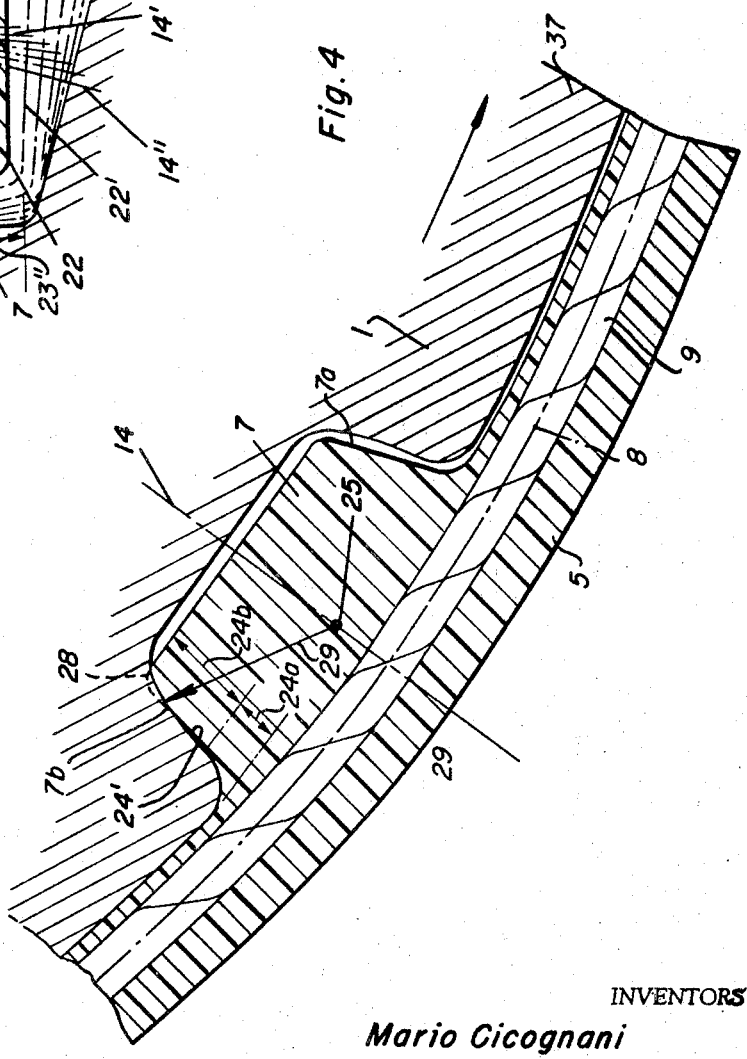
INVENTORS
*Mario Cicognani*
*Augusto Previati*
BY *Stevens, Davis, Miller & Mosher*
ATTORNEYS

United States Patent Office

3,404,576
Patented Oct. 8, 1968

3,404,576
BELT AND GEAR DRIVE
Mario Cicognani and Augusto Previati, Milan, Italy, assignors to Pirelli S.p.A., Centro Pirelli, Milan, Italy
Filed Oct. 28, 1966, Ser. No. 590,406
Claims priority, application Italy, Nov. 12, 1965, 25,191/65
8 Claims. (Cl. 74—229)

ABSTRACT OF THE DISCLOSURE

A power drive comprising at least two gears having teeth on their peripheries adapted to drivably engage corresponding teeth formed on a belt of elastically deformable material. At least one lateral face of each tooth of each of said gears has a profile formed by a first portion shaped as an involute curve and extending adjacent the outer face of the tooth, and a second portion shaped as an arc of a circle, the length of said second portion being at least as great as the length of said first portion.

---

The present invention relates to an improved belt and gear drive and more particularly to the outline of the gear teeth of the belt and gears in such an arrangement.

A belt and gear drive usually comprises one or more toothed gears of indeformable material, which mesh with a toothed belt whose teeth have generally planar faces with fillets at their junction with the belt, and are of elastically deformable material (elastomers or plastic), and which may be provided with an appropriate covering. In the known type of power transmissions, the power is transmitted due to the meshing between the gear teeth and the belt teeth, and, as in a conventional sprocket chain, the relative motion between the gear teeth and the belt teeth takes place only during the engagement and disengagement phases.

It is therefore necessary, in this type of arrangement, to avoid interferences between the profiles of the belt and gear teeth, since they would otherwise cause excessive wear due to friction, resulting in consequent cracks at the base of the belt teeth and irregularities in the transmission of the motion. On the other hand, it is also necessary to reduce the clearances between the belt teeth and the gear teeth along their meshing lateral faces, especially in power transmissions requiring great precision, and those with nonconstant or even alternating torques. This is necessary not only in order to prevent possible displacements in the transmission, but also to minimize the mutual slipping between the belt flutes and the top surface of the gear teeth.

Up to the present time, belt and gear drive systems were used which were based on the simplified hypothesis that both the belt and gears are indeformable, taking into account only the flexibility of the belt and the friction between the working surfaces. Consequently, in order to define the most appropriate profile of the belt and gear teeth, the examination of the meshing action was made by assuming that the critical conditions of the transmission takes place, to the same degree, both in the engagement and disengagement positions of the teeth. The adoption of such an assumption leads again to the conditions of the transmission system obtained with sprocket chains and gears made of metal, namely with quite indeformable elements.

Actually, in a belt and gear drive, it is necessary to take into account the deformability of all of the parts of the belt, and, in particular, the deformability of its teeth. This is necessary to define the correct profile of the gear teeth so as to avoid the above-indicated drawbacks (excessive wear, irregular transmission of motion and so on) which takes place in a dramatic way in the engagement between the belt and the gear having the smallest number of teeth.

The applicant has experimentally ascertained that the hypothesis that the working elements of a belt and gear drive are indeformable is true only in the engagement phase, and that the most critical working condition occurs in the disengagement phase, in which the effect of the deformation of the belt teeth cannot be overlooked. This can be easily understood by taking into account that, in the engagement phase, the belt teeth are not subjected to any stress, whereas in the subsequent phase of complete meshing, they are compressed and deformed against the corresponding gear teeth (both in the case of the driven or the driving gear). Further, the belt teeth deform elastically in the disengagement phase while reacting to the lack of load, and become damaged due to the frictional engagement with the gear teeth.

An object of the present invention is to define the most suitable profile of the gear teeth in a belt and gear drive in which all parts of the belt are considered as being deformable, including the teeth.

A further object of the present invention is to provide a belt and gear drive in which the profiles of the gear teeth are formed so as to reduce or eliminate deformation of the belt teeth when they are in the position of disengagement from the gear teeth.

A further object of the present invention is to provide a toothed gear for a belt and gear drive, in which the gear teeth are formed according to the above-indicated principle, and each has a profile constituted by two portions— a first portion located nearer to the outer face and shaped as an involute curve, and a second portion shaped as an arc of a circle, the length of the second portion being not smaller than the length of the first portion.

The present invention will be more clearly understood from the following description, made with reference to the attached drawings, given by way of nonlimiting example, in which:

FIG. 1 represents, diagrammatically, a belt and gear drive comprising two spur gears drivingly interconnected by an endless gear toothed flexible belt of reinforced elastic material;

FIG. 2 is a cross-sectional view depicting the belt and gear drive in the engagement phase, illustrating, in phantom lines, the successive steps in the meshing of a belt tooth with two gear teeth;

FIG. 3 is a cross-sectional view depicting the belt teeth in complete mesh with the gear teeth 37 of gear 1; and FIG. 4 is a cross-sectional view depicting the interaction of the gear and belt teeth in the disengagement position according to the principle of the present invention.

Referring specifically to the drawings, FIG. 1 represents two toothed gears 1 and 2 rotating about their respective axes of rotation 3 and 4 and connected to each other by means of a toothed belt 5. The reference numeral 6 indicates the pitch of the teeth 7 of the belt, defined as the distance between the axes of two adjacent teeth measured at the pitch line 8 coincident with the axis of the imbedded reinforcing cord or cable 9.

For correct power transmission, it is necessary to comply with the following requirements:

(1) The pitch line 8 of the belt must coincide with the pitch circles 10 and 11 of gears 1 and 2, respectively, the pitch circles of the gears thus being positioned outside the outer faces of the gear teeth;

(2) The pitch 6 of the belt teeth 7 must have, in their rest position, the same value as the pitch 12 of the teeth of both gears 1 and 2, measured at the pitch circles 10 or 11.

It should be noted that the lateral faces 7a and 7b of the belt teeth 7 are parallel to each other and are planar and symmetrical with respect to the tooth axis 14, and are inclined at an angle 15 with respect to said axis, the magnitude of angle 15 depending on the material constituting the teeth in relation to their coefficient of sliding friction.

Although the following description relates to belts in which the lateral faces of the teeth are planar, it is to be understood that a like method can be followed in respect to belts in which profiles of the lateral faces of the teeth are slightly curved.

Considering the motion as taking place in a counterclockwise direction, as indicated by the arrow, and assuming gear 1 to be the driving gear, the most critical positions of the belt with respect to the gears is position 16 in which the belt meshes with the gear 1, and position 17 in which the teeth of the belt disengage from the gear. If motion is reversed, these positions, of course, will be inverted.

As seen in FIGS. 1 and 3, the lateral faces 7b of the belt teeth 7 are compressed against the corresponding lateral faces 20 of gear teeth 37 of gear 1, and lateral faces 7a of belt teeth 7 are compressed against faces 21 of teeth 47 of gear 2 in the direction of the load, this engagement taking place between the meshing arcs defined by positions 16 and 17 for gear 1, and positions 18 and 19 for gear 2.

FIG. 2 represents, in detail, the belt and gear teeth relationships in the engagement position 16 assuming that the belt teeth are not deformed while they are in the engagement position. In this position, and according to this assumption, it is sufficient for the outlines of the gear teeth and the belt teeth to be conjugated to each other. Taking into account the two substantial requirements indicated above in respect of the regularity of the motion, and considering that the flexing of the belt takes place along the axis of the reinforcing cord or cable 9, the relative movement between the belt and the gear can be represented by the relative movement between the pitch line 8 of the belt and the pitch circle 10 of the toothed gear 1. This movement can, in turn, be represented by successive tangents, as shown by way of example in FIG. 2, where 14 is the axis of the belt tooth 7 before the engagement and where successive positions of the same axis are shown, with 14' being the initial position of engagement, and 14" the position of full meshing. Since it has been assumed that the belt teeth are substantially not deformed in the engagement position, each displacement of the axis 14 results in a corresponding displacement of the profile 22 of a belt tooth 7. The successive positions of this profile are shown in FIG. 2, the innermost and the outermost ones being indicated by 22' and 22" respectively, 22" of course corresponding to the position of full engagement.

The profiles of the gear teeth 37 (as well as teeth 47 of gear 2) are obtained as a curve formed by the successive positions of the lateral faces of the belt tooth as illustrated in FIG. 2. The resulting curve is an involute curve formed by the union of the two arcuate zones 23' and 23".

FIG. 3 represents, in detail the teeth 7 of the belt subjected to the load generated by the power transmission and meshing with the corresponding teeth 37 of the gear 1. As shown, the faces 7b are compressed to the involute curve 24 of face 20 constituted by the two zones 23' and 23" of the gear teeth 37. This deforming compression is due to the elastic properties of the material constituting the belt.

From FIG. 3 it can be seen that the unengaged lateral face 7a of the belt tooth maintains its original planar profile since it is not in contact with the adjacent gear tooth.

When the belt tooth 7 disengages from the gear tooth 37, a frictional slipping action between the engaging surfaces 7b and 20 of the meshing teeth takes place with the unit area pressure rapidly increasing as the engaged surface area is reduced.

As the gear and belt teeth slide apart, the profile of the disengaging belt tooth face 7b is rapidly and increasingly deformed by the angular rotation of the gear tooth 37 with respect to belt tooth 7. This is especially true as the leading edge of tooth 37 presses against face 7b nearer and nearer its outer edge.

In practice, the disengagement of tooth 7 of the belt from a tooth of the gear can be summarized in two subsequent phases.

In the first phase the feature to be mainly taken into account is the elastic deformation of the belt tooth. In the second phase the relative disengaging movement between the belt and gear teeth should be taken into account. A more detailed analysis of the disengaging phase is made herebelow with reference to FIG. 4.

As tooth 7 disengages from tooth 37, it tends to rotate relative to gear tooth 37 about a point 25 situated on axis 14 of the belt tooth, and disposed between the point of intersection 26 of said axis 14 with the pitch line 8 of the belt 5, and the center of gravity 27 of tooth 7 (see FIG. 3). This movement, in combination with the rapidly increasing pressure toward the outer edge of face 7b causes vibrations, and early wear of the belt teeth, and other defects in the system.

It is therefore necessary to modify the outline of the gear tooth taking into consideration the relative motion of the teeth and the elastic behavior of the belt tooth. As shown in FIG. 4, the solution of this problem is obtained by forming the outer portion of the lateral face 20 of the gear tooth 37 with an involute outline 24a (as at 23' in FIG. 2), and the remaining portion of said face with a profile shaped as an arc of a circle having a definite center and radius, as shown at 24b, and having a length at least as great as that of the portion 24a.

This arc is, in fact, defined by positioning its center at point 25 as indicated above with reference to FIG. 3. Moreover, its radius 29 is such that the arc-shaped portion 24b joins the involute portion 24a smoothly at their point of tangency. It is thus possible to obtain a profile of the gear teeth 37 which results in minimum increases of friction and pressure on the belt teeth 7 during disengagement. This results in increased belt life and smoother, quieter operation.

In order to emphasize the modification of the profile of the gear tooth obtained in accordance with the present invention, the dotted line 28 of FIG. 4 represents a tooth profile formed by a conventional involute curve, and the solid line 24' represents the tooth profile formed according to the present invention. The connections of the lateral face of the gear tooth with the dedendum circle and outer face of said tooth have not been considered here, as this problem has already been solved with the conventional processes used in the constructional technique.

Of course, in order that the transmission may be operated in both senses, the teeth of the gear must have both lateral faces formed according to the profile described in the present invention.

By way of example, for a toothed belt in which the teeth pitch ranges between 10 and 15 mm., the value of the modifying radius 29 will be comprised between 2.7 and 3.0 mm. according to the materials used in the belt, reinforcing cable, and in the outer covering of the tooth, if any.

Of course, variations of the specific construction and arrangement of this type mechanism herein disclosed can be made by those skilled in the art without departing from the invention as defined in the appended claims.

What is claimed is:

1. A power drive comprising at least two gears having teeth on their peripheries and at least one belt of elastically deformable material drivably engaging said gears and having teeth formed thereon adapted to mesh with said gear teeth, at least one lateral face of each tooth of each of said gears having a profile formed by a first portion shaped as an involute curve and extending adjacent the outer face of the tooth, and a second portion shaped as an arc of a circle, the length of said second portion being at least as great as the length of said first portion.

2. A belt and gear drive as in claim 1, wherein said profile is radiused to the dedendum circle and outer face of the tooth.

3. A belt and gear drive as in claim 1, wherein the center of said arc is located on the axis of the belt tooth coincident with the axis of the corresponding groove of the gear, said center being disposed on said axis at a point located between the center of gravity of the belt tooth and the point of intersection of the tooth axis with the pitch circle of the belt, and wherein the radius of said arc is such that said second portion is radiused to said first portion.

4. A belt and gear drive as in claim 1, wherein both the lateral faces of the teeth of each gear have a profile as described in order to carry out the power transmission in two directions.

5. A toothed gear having a plurality of teeth, at least one lateral face of each tooth having a profile formed by a first portion shaped as an involute curve and extending adjacent the outer face of the tooth, and a second portion shaped as an arc of a circle, the length of the second portion being at least as great as the length of the first portion.

6. A toothed gear as in claim 5, wherein said profile is radiused to the dedendum circle and outer face of the tooth.

7. A toothed gear as in claim 5, wherein both the lateral faces of the teeth of the gear have a profile as described in order to carry out the power transmission in two directions.

8. The drive of claim 1, wherein said first portion of said profile is formed in accordance with the shape of the corresponding meshing faces of said belt teeth.

References Cited

UNITED STATES PATENTS 2,937,537   5/1960   Worrall _____ 74—231 X
3,225,615   12/1965  Little _____ 74—416

FRED C. MATTERN, JR., *Primary Examiner.*

LEONARD H. GERIN, *Assistant Examiner.*